Dec. 23, 1924.

A. B. REAVIS

SOLDERING IRON

Filed June 29, 1923

1,520,597

INVENTOR.

Andrew B. Reavis

Patented Dec. 23, 1924.

1,520,597

UNITED STATES PATENT OFFICE.

ANDREW B. REAVIS, OF BETHLEHEM, PENNSYLVANIA.

SOLDERING IRON.

Application filed June 29, 1923. Serial No. 648,590.

*To all whom it may concern:*

Be it known that I, ANDREW B. REAVIS, a citizen of the United States, and residing at Bethlehem, Lehigh County, State of Pennsylvania, have invented certain new and useful Improvements in Soldering Irons, of which the following is a specification.

My invention relates to soldering irons and it has for its object to provide apparatus of this character which shall be capable of conserving heat and utilizing the latter effectively, so that, for the same effective soldering period, the size of the soldering iron may be reduced, or, for the same size, the effective period may be greatly extended.

More particularly my invention has for its object to provide a heat-insulating cover for the body portion of the heating element to restrict the flow of heat therefrom except through the soldering tip. If the soldering iron is of the internally-heated type the heating element or copper is covered, except for the soldering point or tip, by a fixed cover of heat-insulating material. With irons of the ordinary type, where the heating elements or coppers are heated from some external source, as from a gas flame, my heat-insulating jackets or covers are made movable with respect to the heating elements or coppers in order that the latter may be exposed when being heated and may have the body portions thereof covered after being heated and while the iron is used in soldering.

Apparatus made in accordance with my invention is illustrated in the accompanying drawings, forming a part of this application, in which.

Figure 1:
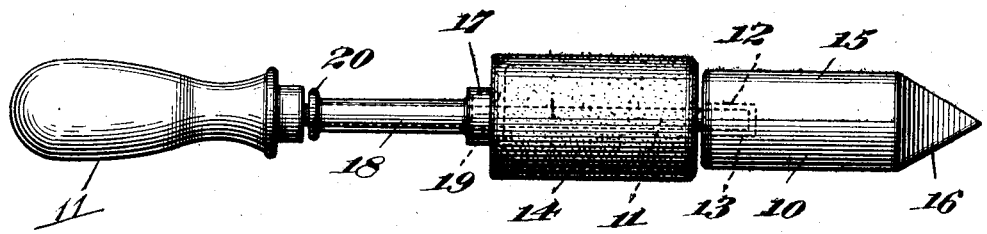
Fig. 1 is an elevational view of a soldering iron showing my improvement applied thereto.
Figure 2:
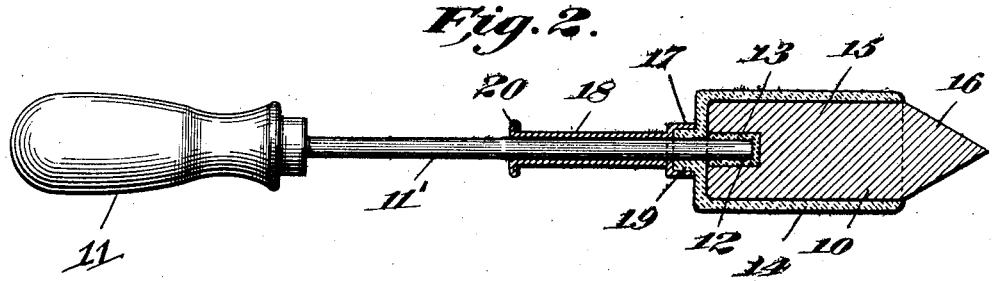
Fig. 2 is a view, partly in section, of the form of apparatus shown in Fig. 1.

Referring now to the drawings for a better understanding of my invention, in Figs. 1 and 2, I show a soldering iron comprising a heating element, copper or head portion 10, connected to a handle 11 by a shank 11', preferably connected by a heat-insulating connection at 12.

As shown, the heat-insulating connection 12 is comprised by asbestos, or material having similar characteristics from the standpoint of high resistance to heat transmission, separating the inner end of the handle 11 from the walls and bottom of the socket 13 in which it is placed.

In Figs. 1 and 2, I show a jacket 14 made of any suitable material having a high resistance to the transmission of heat, for example, asbestos or equivalent material. The jacket 14 is adapted to be moved to cover and uncover the body portion 15 of the heating element, copper or head portion 10, the body portion 15 being shown uncovered in Fig. 1 and covered in Fig. 2. When the body portion is covered, the soldering tip portion 16 is left exposed. Owing to the heat-insulating connection between the heating element and the handle and to the heat-insulating jacket, when covered, the body portion 15 of the heating element or copper is effectively insulated or isolated, thereby minimizing the loss of heat at the sides and at the end next to the handle and compelling the stored-up heat to flow out through the tip 16 where it is required.

In Figs. 1 and 2, the heat-insulating jacket is preferably cup-shaped and it has an opening 17 fitting the handle closely. Any suitable means may be used to move the jacket; and, by way of example, I show a sleeve 18, slidable on the shank or rod 11' and having one end secured to a boss 19 on the jacket or cup 14 and having, at its other end, a hand-hold means 20 so that the jacket may be readily moved.

Figure 3:
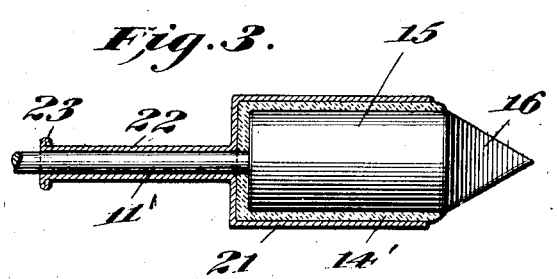
Fig. 3 is a fragmentary sectional view showing a modified form of my invention.

The modification shown in Fig. 3 is the same essentially as that shown in Figs. 1 and 2 except that a thin metal protective jacket 21 surrounds the heat-insulating jacket 14'. Preferably the jacket 21 is connected to a sleeve 22 slidable on the shank 11' and having a button 23 to be grasped for moving the jacket.

Figure 4:
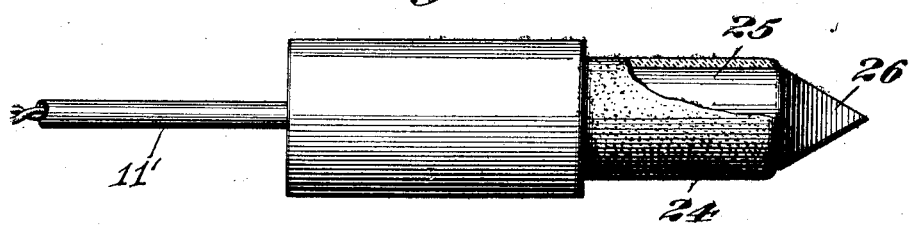
Fig. 4 is a view, partly in section, of a further modified form of my invention.

In Fig. 4, I show a modification of my invention in which a fixed heat-insulating jacket 24 surrounds the body portion 25 of a heating element of an internally-heated soldering iron, leaving the soldering tip 26 exposed, thereby limiting dissipation of heat laterally of the body portion 25 and compelling more heat to pass out through the tip 26 than would otherwise be the case.

From the foregoing it will be apparent that, by the use of my heat-insulating jacket, useless dissipation of heat from the heating element is very largely avoided, making it possible to have a smaller iron equipped with my jacket to retain heat just as long as a larger ordinary iron, or, if of the same size as an ordinary iron, to retain heat for a longer period than the latter.

It is to be understood that the word "copper," as used herein, contemplates any suitable material out of which the heating elements of soldering irons are customarily made.

While I have shown my invention in three forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention what is claimed as new and desired to be secured by Letters Patent is:

1. A soldering iron comprising a heating element and a jacket construction of heat-insulating material movable to cover and to uncover the heating element with the exception of the tip portion thereof and, when in covering position, circumferentially engaging the heating element to conserve heat.

2. A soldering iron comprising a heating element, a jacket construction of heat-insulating material movable to cover and to uncover the heating element with the exception of the tip portion thereof and, when in covering position, circumferentially engaging the heating element to conserve heat, and means for moving the jacket construction.

3. A soldering iron comprising a heating element consisting of a body portion and a tip portion and a heat-insulating cup for covering and uncovering the body portion and having an interior surface which engages the exterior surface of the body portion when in covering position to conserve heat in said element.

4. A soldering iron comprising a heating element, a shank connected to the heating element, a heat-insulating cup slidable on the heating element, and means slidable on the shank and connected to the cup for moving the latter.

5. A soldering iron comprising a heating element, a shank, a heat-insulating connection between the shank and the heating element, and a cup consisting of heat-insulating material slidable with respect to the heating element to cover and to uncover the latter with the exception of the tip portion thereof and to engage said element circumferentially when in covering position in order to conserve heat therein.

6. The combination, with a soldering iron having a heating element provided with body and tip portion and a shank connected to the body portion, of a jacket of heat-insulating material covering the body portion and having an opening in the back wall thereof which fits the shank.

7. The combination, with a soldering iron having a heating element provided with body and tip portions and a shank connected to the body portion, of a movable cup of heat-insulating material for covering and uncovering the body portion and having an opening in the back wall thereof which fits the shank, said cup, when in covering position, engaging the body portion circumferentially to conserve heat.

8. The combination, with a soldering iron having a heating element provided with body and tip portions and a shank connected to the body portion, of a movable cup of heat-insulating material for covering and uncovering the body portion and having an opening in the back wall thereof which fits the shank, said cup, when in covering position, engaging the body portion circumferentially to conserve heat, and means for moving the cup longitudinally of the shank and of the heating element.

9. The combination, with a soldering iron having a heating element provided with body and tip portions and a shank connected to the body portion, of a jacket of heat-insulating material for covering and uncovering the body portion and means movable with respect to the shank for moving the jacket, said jacket, when in covering position, circumferentially engaging the body portion to conserve heat.

10. The combination, with a soldering iron having a heating element provided with body and tip portions and a shank connected to the body portion, of a jacket of heat-insulating material for covering and uncovering the body portion and a sleeve slidably mounted on the shank for moving the jacket, said jacket, when in covering position, circumferentially engaging the body portion to conserve heat.

11. A soldering iron comprising a heating element consisting of a body portion and a tip portion, a shank for the heating element, and a heat-insulating connection between the end of the body portion remote from the tip portion and the shank and constituting the sole means whereby the element may be supported by the shank.

12. A soldering iron comprising a heating element consisting of a body portion and a tip portion and the body portion having an axial opening in the end thereof remote from the tip portion, a handle shank fitting in the opening, and heat-insulating packing between the shank and the walls of the opening.

13. A soldering iron comprising a heating element having a body portion and a soldering tip portion, a handle shank, a heat-insulating connection between the handle shank and the body portion, a jacket construction consisting of heat-insulating material and movable with respect to the body portion for covering and uncovering the latter and, when in covering position, circumferentially engaging the body portion to conserve heat therein, and means for moving the jacket construction.

In testimony whereof I hereunto affix my signature.

ANDREW B. REAVIS.